US009415365B2

(12) United States Patent
Chandler et al.

(10) Patent No.: US 9,415,365 B2
(45) Date of Patent: Aug. 16, 2016

(54) COATING A MONOLITH SUBSTRATE WITH CATALYST COMPONENT

(71) Applicant: Johnson Matthey Public Limited Company, London (GB)

(72) Inventors: Guy Richard Chandler, Cambridge (GB); Keith Anthony Flanagan, Cambridge (GB); Paul Richard Phillips, Royston (GB); Paul Schofield, Wirral (GB); Michael Leonard William Spencer, Baldock (GB); Hedley Michael Strutt, Biggleswade (GB)

(73) Assignee: Johnson Matthey Public Limited Company, London (GB)

( * ) Notice: Subject to any disclaimer, the term of this patent is extended or adjusted under 35 U.S.C. 154(b) by 55 days.

(21) Appl. No.: 14/199,323

(22) Filed: Mar. 6, 2014

(65) Prior Publication Data
US 2014/0186232 A1 Jul. 3, 2014

Related U.S. Application Data

(62) Division of application No. 12/984,290, filed on Jan. 4, 2011, now Pat. No. 8,703,236.

(30) Foreign Application Priority Data

Jan. 4, 2010 (GB) .................................. 1000019.8

(51) Int. Cl.
*B01J 15/00* (2006.01)
*A44B 13/00* (2006.01)
(Continued)

(52) U.S. Cl.
CPC ............ *B01J 15/005* (2013.01); *A44B 13/0011* (2013.01); *B05C 9/02* (2013.01); *B05C 9/04* (2013.01); *B05C 9/045* (2013.01)

(58) Field of Classification Search
CPC ............ B05C 9/02; B05C 9/04; B05C 9/045; B01J 15/005
USPC .......................... 118/408, 421, 423, 428, 500
See application file for complete search history.

(56) References Cited

U.S. PATENT DOCUMENTS 2,639,052 A 5/1953 Charles et al.
4,142,864 A 3/1979 Rosynsky et al.
(Continued)

FOREIGN PATENT DOCUMENTS

CN 1461672 12/2003
DE 102009009579 A1 9/2010
(Continued)

OTHER PUBLICATIONS

British Search Report from GB App. No. 1100047.8, dated Apr. 26, 2011.
(Continued)

*Primary Examiner* — Laura Edwards
(74) *Attorney, Agent, or Firm* — Gary D. Mangels

(57) ABSTRACT

A method of coating a honeycomb monolith substrate comprising a plurality of channels with a liquid comprising a catalyst component comprises the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

10 Claims, 10 Drawing Sheets

(51) Int. Cl.
  *B05C 9/04* (2006.01)
  *B05C 9/02* (2006.01)

(56) References Cited

U.S. PATENT DOCUMENTS

| | | | |
|---|---|---|---|
| 4,171,288 A | 10/1979 | Keith et al. | |
| 4,550,034 A | 10/1985 | Shimrock et al. | |
| 4,609,563 A | 9/1986 | Shimrock et al. | |
| 4,931,419 A | 6/1990 | Blanchard et al. | |
| 5,422,138 A | 6/1995 | Watanabe et al. | |
| 5,516,494 A | 5/1996 | Domesle et al. | |
| 5,953,832 A | 9/1999 | Rosynsky et al. | |
| 6,127,300 A | 10/2000 | Kharas et al. | |
| 6,149,973 A * | 11/2000 | Foerster | B05D 7/22 427/235 |
| 6,478,874 B1 * | 11/2002 | Rosynsky | B01J 37/0215 118/50 |
| 7,374,792 B2 | 5/2008 | Rosynsky et al. | |
| 7,476,417 B2 | 1/2009 | Dettling et al. | |
| 7,521,087 B2 | 4/2009 | Rosynsky et al. | |
| 2001/0024686 A1 * | 9/2001 | Kiessling | B01J 35/0006 427/235 |
| 2001/0026838 A1 | 10/2001 | Dettling et al. | |
| 2003/0003232 A1 | 1/2003 | Rosynsky et al. | |
| 2003/0044520 A1 * | 3/2003 | Kiessling | B01J 35/04 427/79 |
| 2003/0072694 A1 | 4/2003 | Hodgson et al. | |
| 2005/0031514 A1 | 2/2005 | Patchett et al. | |
| 2007/0116870 A1 | 5/2007 | Dettling et al. | |
| 2007/0154728 A1 | 7/2007 | Ohno et al. | |
| 2008/0145531 A1 | 6/2008 | Rosynsky et al. | |
| 2008/0200328 A1 | 8/2008 | Eberle et al. | |
| 2009/0193796 A1 | 8/2009 | Wei et al. | |

FOREIGN PATENT DOCUMENTS

| | | |
|---|---|---|
| EP | 1057519 A1 | 12/2000 |
| EP | 1325781 A1 | 7/2003 |
| EP | 1850068 | 10/2007 |
| EP | 2158956 | 3/2010 |
| JP | 2001276629 A | 10/2001 |
| JP | 2004167460 A | 6/2004 |
| JP | 2006021128 A | 1/2006 |
| JP | 2007144371 A | 6/2007 |
| JP | 2009189983 A | 8/2009 |
| WO | 9947260 | 9/1999 |
| WO | 0001463 A1 | 1/2000 |
| WO | 0180978 A1 | 11/2001 |
| WO | 2004079167 | 9/2004 |
| WO | 2005016497 | 2/2005 |
| WO | 2010006274 | 1/2010 |
| WO | 2010114873 A2 | 10/2010 |

OTHER PUBLICATIONS

GB Search Report for corresponding Great Britain Patent Application No. GB1203268.6 dated May 30, 2012.
International Search Report for corresponding PCT Patent Application No. PCT/GB2011/050005 dated Apr. 26, 2011.
Kazutake Ogyu et al.; Improving of the Filtration and Regeneration Performance by the Sic-DPF with the Layer coating of PM Oxidation Catalyst; SAE Paper No. 2008-01-0621, Copyright 2008 SAE International, pp. 1-6.

* cited by examiner

COATING A MONOLITH SUBSTRATE WITH CATALYST COMPONENT

CROSS-REFERENCE TO RELATED APPLICATIONS

This is a divisional of application Ser. No. 12/984,290, filed Jan. 4, 2011, which was issued as U.S. Pat. No. 8,703,326 and which claims priority to United Kingdom Application No. 1000019.8, filed Jan. 4, 2010. The entire teachings of the above applications are incorporated herein by reference.

FIELD OF THE INVENTION

The present invention relates to a method of, and an apparatus for, coating a honeycomb monolith substrate comprising a plurality of channels with a liquid comprising a catalyst component.

BACKGROUND OF THE INVENTION

"Honeycomb monolith substrate" as defined herein includes metal and ceramic flow-through monoliths having a plurality of channels or cells which extend longitudinally along the length of the substrate structure and wherein the channels are open at both ends thereof; and metal and ceramic filters including ceramic wall-flow filters having a plurality of channels or cells which extend longitudinally along the length of the substrate structure and wherein channels at a first end of the substrate that are open are blocked at the opposite end and channels that are open at the opposite end are blocked at the first end, the arrangement being such that every other adjacent cell has an open end (or a blocked end) on the first end of the wall-flow filter and a blocked end (or an open end) on the opposite end thereof so that when an end of the wall-flow filter is viewed it resembles a chess board of open and blocked channels. Fluid communication between the open channels at the first end of the wall-flow filter and the open channels of the opposite end thereof is via the porous wall structure of the wall-flow filter.

The definition "honeycomb monolith substrate" also includes metallic so-called "partial filters" such as that which is disclosed in WO 01/80978 or the substrate disclosed in EP 1057519.

Typically, ceramic materials for manufacturing honeycomb monolith substrates include silicon carbide, aluminium nitride, silicon nitride, aluminium titanate, sintered metal, alumina, cordierite, mullite, pollucite, a thermet such as $Al_2O_3/Fe$, $Al_2O_3/Ni$ or $B_4C/Fe$, or composites comprising segments of any two or more thereof.

The formulation of liquids comprising catalyst components for coating honeycomb monolith substrates are known to those skilled in the art and include: aqueous solutions of platinum group metal compounds, such as platinum, palladium and rhodium compounds, aqueous solutions of alkali metal and alkaline earth metal compounds for depositing compounds for absorbing $NO_x$ on the substrates, and other components such as compounds of transition metals e.g. iron, copper, vanadium, cerium and transition metal catalyst promoter compounds; washcoat slurries including particulate catalyst support materials such as alumina, ceria, titania, zirconia, silica-alumina and zeolites, optionally supporting one or more of the above mentioned platinum group metals or transition metals; and washcoat slurries containing combinations of supported metal compounds and aqueous solutions of the above mentioned metal compounds. Such liquids can also include relevant acids, organic compounds thickeners etc. to improve the catalyst activity, chemistry of the formulation to suit the intended purpose of the resulting catalyst, and/or the viscosity and rheology of the liquid.

Apparatus for automatedly coating a honeycomb monolith substrate is known, for example, from our WO 99/47260 and from U.S. Pat. No. 5,422,138. The latter reference discloses an apparatus comprising means for holding a honeycomb monolith substrate substantially vertically and means for introducing a pre-determined volume of a liquid into the substrate via open ends of the channels at a lower end of the substrate.

EP 1325781 discloses a development of the coating technique disclosed in U.S. Pat. No. 5,422,138 that can be used to produce modern "zoned" substrates.

SUMMARY OF THE INVENTION

The present inventors have investigated known techniques for coating a honeycomb monolith substrate with a liquid comprising a catalyst component with particular emphasis on coating filter substrates and they encountered a number of problems.

One problem was that if a liquid washcoat is too viscous, the back pressure in the filter can be too high for practical application of the filters in exhaust systems of diesel vehicles. The inventors found that washcoat viscosities of about 50 cps may be required for coating filters and that such low viscosity washcoats often resulted in uneven coating across the filter substrate when using known coating methods.

In practice, the inventors found that it was useful to match the water absorption factor of the substrate to the suspending liquid content in a washcoat to achieve a desired percentage axial coating depth; if the two were not matched, the coating could lack stability under drying. By removing the suspending liquid, typically water, from the washcoat on the substrate, washcoat components are immobilised.

Furthermore, the inventors observed that by removing thickeners from the washcoat formulation, resulting in a lower viscosity washcoat, the drying time could be reduced.

An alternative method was investigated that included placing a wall-flow filter substrate in a bath of aqueous solution and allowing the solution to impregnate the filter by capillary action, then drying and calcining the impregnated wall-flow filter substrate. However, it was found that this method did not lend itself readily to automation because the impregnation step and the subsequent drying step were too slow. Moreover, the method was not flexible enough to allow for customer needs such as catalyst "zoning" to improve activity and to thrift expensive platinum group metals.

The method and apparatus disclosed in U.S. Pat. No. 5,422,138 uses higher viscosity slurries, e.g. 100 to 500 cps and so would not appear to be of practical use in the field of coating filter substrate monoliths with the desirable lower viscosity slurries. Furthermore, the use in this method of excess quantities of liquid containing expensive platinum group metals to coat honeycomb monolith substrates can lead to the inefficient loss of some liquid. In this art, it is also important that a coated honeycomb monolith substrate complies with a contracted specification agreed between a coated honeycomb monolith substrate manufacturer and its customer since excessive coating of expensive platinum group metals can reduce the manufacturer's profit, whereas coating the honeycomb monolith substrate with too little platinum group metal can result in the manufacturer coming into conflict with its customer.

The inventors have developed a method of, and apparatus for, automatedly coating honeycomb monolith substrates, particularly filters, with lower viscosity liquids comprising catalyst components that enables more careful and accurate loading of expensive platinum group metal components and prevents losses in the manufacturer's factory.

According to one aspect, the invention provides a method of coating a honeycomb monolith substrate comprising a plurality of channels with a liquid comprising a catalyst component, which method comprising the steps of: (i) holding a honeycomb monolith substrate substantially vertically; (ii) introducing a pre-determined volume of the liquid into the substrate via open ends of the channels at a lower end of the substrate; (iii) sealingly retaining the introduced liquid within the substrate; (iv) inverting the substrate containing the retained liquid; and (v) applying a vacuum to open ends of the channels of the substrate at the inverted, lower end of the substrate to draw the liquid along the channels of the substrate.

In an embodiment, a step of sealing an outer surface of the substrate from, i.e. sealing from liquid communication with, the open ends of the channels at the lower end of the substrate is inserted between steps (i) and (ii).

In another embodiment, the seal retaining the liquid in step (v) is removed only after a vacuum has been applied.

In another embodiment of the method, the substrate is a filter, as defined herein.

According to a second aspect, the invention provides an apparatus for coating a honeycomb monolith substrate comprising a plurality of channels with a liquid comprising a catalyst component, which apparatus comprising: (a) means for holding a honeycomb monolith substrate substantially vertically; (b) means for introducing a pre-determined volume of the liquid into the substrate via the open ends of the channels at a lower end of the substrate; (c) means for sealingly retaining the introduced liquid within the substrate; (d) means for inverting the substrate containing the retained liquid; and (e) means for applying a vacuum to open ends of the channels of the substrate at the inverted, lower end of the substrate to draw the liquid along the channels of the substrate.

BRIEF DESCRIPTION OF THE DRAWINGS

In order that the invention may be more fully understood, reference may be made to the series of schematic representations of an embodiment of the apparatus and method steps of the invention shown in the accompanying drawings, in which.

DETAILED DESCRIPTION OF THE INVENTION

Figure 1:
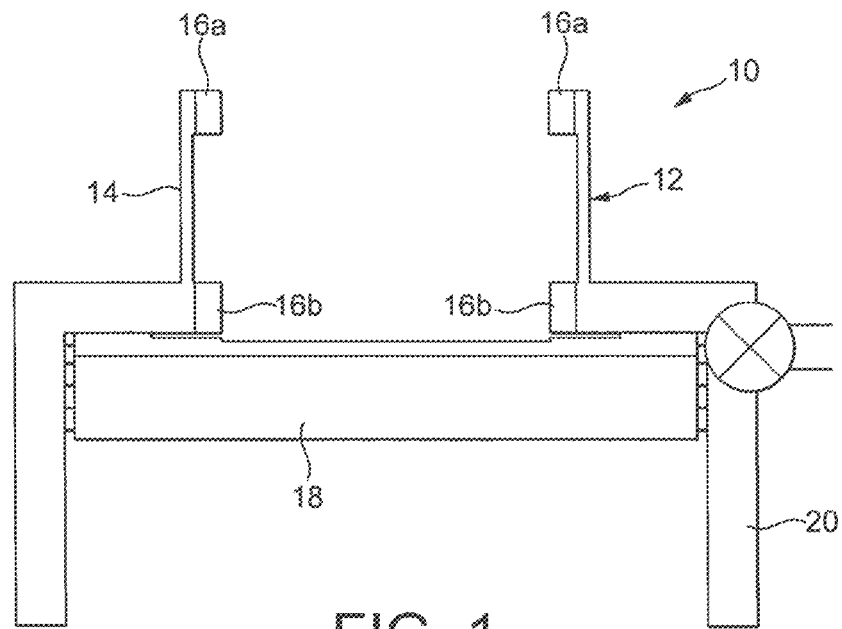
FIG. 1 shows the starting position for an apparatus according to the invention, without a substrate.

Whilst the substrate can be manually inserted into the holding means, it is preferred to use a robotic "pick-and-place" device in order to increase the automation of the method as a whole.

In an embodiment, the holding means comprises a housing for receiving at least the lower end of the substrate. The skilled engineer will appreciate that not all substrates have a conventional circular cross-section, but can also take the form of oval or "race-track", skewed oval or other asymmetric cross-section. Whatever the cross-section of the substrate, the skilled engineer can adopt a suitably shaped housing for receiving the substrate, as appropriate.

The holding means can comprise any suitable means for holding the substrate, for example stiff bristles, or a flexible fin of elastomeric material supported by an internal wall of the housing, that extend into the interior space of the housing and are deformed as the substrate is inserted into an opening of the housing, or three or more equally-spaced feet disposed in a substantially common axial plane that extend from the internal wall surface of the housing into the interior of the housing for gripping an exterior surface of the substrate following insertion of the substrate into the housing.

In a particular embodiment, however, the holding means comprises at least one inflatable collar disposed on an internal surface of the housing for engaging with an outer surface of the substrate. Whilst the inflatable collar can be in the form disclosed in U.S. Pat. No. 5,422,138, FIGS. 8-16 and associated description, i.e. a collar that contacts the entire axial length of the exterior surface of the substrate, we prefer to use an arrangement comprising a first inflatable collar that contacts the exterior surface at a lower end of the substrate and a second inflatable collar that contacts the exterior surface of the substrate above the lower end of the substrate, e.g. at about midway between the lower and upper ends of the substrate or in an upper half of the substrate. A reason for preferring at least two inflatable collars for engaging the substrate is that the inventors have found that the substrate is held more rigidly and enables higher precision for the following method steps, particularly the inversion step, whereas the single collar shown in U.S. Pat. No. 5,422,138 provides more flexibility in the lateral plane, requiring higher pressures to hold the substrate to the desired level of rigidity.

Any suitable liquid introducing means can be used but in a particular embodiment it comprises a piston that reciprocates within a cylinder. Although the term "cylinder" implies a circular cross-section of a piston head and cylinder bore, in embodiments, the shape of the piston head and cylinder bore is dictated by the cross-section of the substrate, i.e. where the substrate is oval in cross-section, the piston head and cylinder bore are also oval in cross-section. This is because matching the cross-section of piston head and cylinder bore with the substrate can promote coating of the substrate to a more even axial washcoat depth. However, it is not essential to match the cross-section of the substrate with the cross-section of the piston head and cylinder bore as this avoids re-tooling the apparatus for coating substrates of differing cross-sections.

Generally, the piston reciprocates within the cylinder between a first position wherein a surface of the piston head abuts or aligns with a cylinder head and a second position, wherein an internal wall of the cylinder, cylinder head and piston head define a displacement volume.

In one embodiment, the displacement volume is similar, or identical, to the volume of liquid to be introduced into the substrate and the piston returns to the first position following introduction of the liquid into the substrate. This arrangement is preferred in an embodiment wherein the surface of the piston head supports or abuts the lower end of the substrate when the piston is in the first position. This is so that when the substrate is first inserted into the housing, the substrate can be supported by the piston head before the holding means, such as the inflatable collar, is actuated, providing more reliable engagement with the holding means and/or means for sealingly retaining introduced liquid within a substrate (the latter sealing means is discussed hereinbelow).

In an alternative embodiment, the displacement volume is sufficient to accommodate multiple doses of the liquid, i.e. sufficient liquid for introducing single doses into two or more substrates. Of course, in this arrangement it may be necessary to adopt a means for sealingly retaining introduced liquid within a substrate that can retain the liquid in the cylinder in embodiments wherein the cylinder itself is inverted.

The liquid can be supplied into the cylinder suitably via an aperture in the cylinder head through which liquid is introduced into the substrate, through a conduit in the piston rod and piston head or by valve means in a wall of the cylinder housing. In any event, it is desirable to supply only the predetermined volume of liquid to be introduced into the substrate into the displacement volume in order to prevent wastage of the coating liquid. In one arrangement, the displacement volume is the same as the volume of the liquid to be introduced into the substrate so that little or no dead space exists when the displacement volume is charged with the liquid. This is so that the cylinder bore is emptied when the entire volume of the liquid is introduced into the substrate, and the piston head abuts the lower end of the substrate, for reasons explained in greater detail below. Of course, as mentioned above, it is also possible to charge the displacement volume with sufficient liquid for two or more liquid introduction steps, wherein the piston advances step-wise within the cylinder consequently reducing the displacement (and liquid) volume with each step.

The means for sealingly retaining the introduced liquid within the substrate can be any suitable feature, such as a guillotine, iris or shutter or a material having a one-way permeability. However, in a preferred arrangement, the means for sealingly retaining the liquid is a surface of the piston head itself, which can include a material to enhance the seal therebetween e.g. an elastomeric material such as a soft silicone foam or synthetic rubber. Thus, in the above embodiment wherein the entire volume of liquid is expelled from the cylinder into the substrate, i.e., the piston has returned to the first position, the surface of the piston head contacts the lower end of the substrate, thus forming the seal to retain the liquid introduced into the substrate.

In one embodiment, the liquid retaining means is removed prior to application of the vacuum.

However, in another embodiment the liquid retaining means maintains the seal with the end of the substrate until the vacuum means applies a vacuum to the inverted lower end of the substrate, i.e. following switch-off of the vacuum a static vacuum remains in the substrate. Depending on the nature of the sealing means, this is so that the liquid does not flow between cells of the substrate, leading to uneven axial coating depth across the substrate following inversion; or leak from an end of the substrate into which the liquid was introduced, and thence down the outside walls of the substrate, before the vacuum can be applied to draw the liquid along the channels of the substrate—leading to liquid loss and an undesirably less cosmetic appearance of the outer "skin" coating of the substrate. In the embodiment wherein the piston head provides the seal, maintaining sealing engagement with the substrate until the vacuum is applied also provides the advantage of cleaning the piston surface ready for the next substrate.

In a further embodiment, the housing, piston and cylinder are all inverted as a single unit by the inverting means. Desirably, such inverting means comprises a robotic device.

In an embodiment, the apparatus comprises means for sealing an outer surface of the substrate from (i.e. sealing from liquid communication with) the open ends of the channels at the lower end of the substrate. This may be necessary in embodiments wherein the cross-section of the piston bore is a different shape from the cross-section of the substrate, e.g. where the substrate is oval and the piston bore is circular. This is to stop any residual liquid in peripheral "dead space" areas of the cylinder from seeping into the substrate during the inversion step.

Any suitable sealing means for sealing the outer surface of the substrate from the open ends of the channels at the lower end of the substrate can be used, such as the flexible fin mentioned above, but in a particular embodiment the sealing means comprises the inflatable collar, or where more than one inflatable collar is used, the inflatable collar associated with the lower end of the substrate.

The vacuum means can take any suitable form, but in one embodiment it comprises a funnel, the wider end of which is for receiving an inverted end of the substrate.

A seal between the vacuum means and the inverted end of the substrate can be achieved by a fin of flexible material extending into the space defined by the internal surface of the wider end of the funnel, wherein the fin is deformed as the substrate is inserted into the wider end of the funnel and the fin engages with the outer surface of the substrate. In a particular embodiment, however, the internal surface of the wider end of the funnel comprises an inflatable collar for sealingly engaging with the outer surface of the substrate. Since the seal disposed on the vacuum means also grips the substrate, it can be regarded as a second holding means.

The (first) holding means can be disengaged from the coated substrate during application of the vacuum and re-applied following the vacuum step. This may be for at least four reasons:

(i) in the embodiment wherein the piston head comprises the means for sealingly retaining the introduced liquid, wherein the seal is maintained following an application and switch-off of the vacuum, i.e. a static vacuum remains in the substrate, the substrate can form a hydraulic seal with the piston head. The (second) holding means on the vacuum means enables the substrate to be pulled from the piston head;

(ii) to prevent any loss of vacuum in the substrate channels;

(iii) to prevent or reduce substrate edge damage and to protect the substrate; and (iv) to enable air to access the housing and to enter the substrate via the end of the substrate into which the liquid was introduced, although this may also be effected by providing perforations in the wall of the housing.

Following the vacuum step, the apparatus and coated substrate can be returned to its upright position, following which the coated substrate can be removed for drying and optional calcining of the coating.

The method and apparatus of the present invention enables the manufacture of modern "zoned" substrates. Following drying and optional calcining of the coated substrate after a first pass, the same substrate can be coated in a second pass with a different liquid from the opposite end from which the first coating was introduced. For example, the dose weight and solids content of the liquid and the magnitude of vacuum applied, can all be calculated and optimised to achieve any axial depth of coating that is required. It is also possible, in a second pass, to coat the substrate monolith with a different composition from the opposite end to a first pass coating and to achieve a desired amount of overlap between the two coatings where they meet, e.g. 5%. Multiple coatings, e.g. a third pass coating, over the first or second pass coating, can also be done following drying and optional calcining, as desired.

In this way, the present invention enables the manufacture of a filter substrate such as disclosed in our WO 2004/079167, i.e. a zoned filter substrate wherein a first catalyst zone comprises a diesel oxidation catalyst comprising at least one platinum group metal (PGM) for oxidising carbon monoxide, hydrocarbons and nitrogen monoxide and wherein at least one downstream catalyst zone comprises at least one PGM, wherein the total PGM loading in the first catalyst zone is greater than the total PGM loading in the at least one downstream catalyst zone.

In a particular embodiment, the apparatus is controlled by a suitably programmed computer so as to perform, when in use, the series of method steps according to the invention.

The inventors found that the method of coating a honeycomb monolith substrate according to the invention provides particular advantages when applied to making wallflow filters comprising catalysts such as: oxidation catalysts comprising one or more platinum group metals (the resulting coated filter being generally known as a catalysed soot filter of CSF); and catalysts for catalysing the selective reduction of oxides of nitrogen with nitrogenous reductants such as ammonia and ammonia precursors such as urea. It is also believed that the method according to the invention may be used for making filters comprising so-called $NO_x$ absorber catalysts (NACs), also known as Lean $NO_x$ Traps or simply $NO_x$ traps.

The method is flexible in that, with appropriate manipulation of dosing quantities, washcoat solids content and vacuum strength and duration, some or all of the filter channels may be coated, different channel coating lengths can be adopted for inlet and outlet channels and the methods can be used to make zone coated wallflow filter arrangements, e.g. wherein a first axial 20% of the inlet channels are coated with a higher concentration of platinum group metal than the remainder of the inlet channels downstream thereof.

Generally, the washcoat solids content selected for a given washcoat loading is dependent upon the porosity of the part to be coated and the axial length of the coating to be applied, and the precise washcoat solids content required can be determined by routine trial and error. Typically, however, the washcoat solids content will be in the range of about 8-40% solids. Generally, to coat the same axial length of a part, the higher porosity the part, the lower the washcoat solids content to be used. Also, in order to coat different axial lengths from the same part with the same washcoat loading, the shorter the axial length the higher the washcoat solids content. So to coat a typical cordierite or SiC wall-flow filter with a washcoat at a standard washcoat loading, one might select a washcoat solids content of 25% to coat the whole length of the channels. To coat a relatively short zone of a wallflow filter, e.g. to coat a short inlet zone of a catalysed soot filter with a relatively high washcoat loading of platinum group metals, a much higher washcoat solids content can be selected e.g. 30-40%. The washcoat volume for coating a shorter axial length of a part to the same washcoat loading will be less than for a longer axial length of a part.

The vacuum to be applied will generally be in the order of −5 kpa to −50 kpa, with durations ranging from about 0.3 seconds to about 2 seconds, depending on the washcoat solids content (longer vacuum duration for lower washcoat solids content) and size of the part (larger volume parts requiring longer duration and higher vacuum application). However, typically vacuum applications can be of the order of about 1 second. Larger substrates, e.g. those intended for heavy-duty Diesel vehicles, may require higher vacuum application, such as minus 40-50 kpa, whereas light-duty Diesel vehicle parts may require vacuum application of Larger substrates, e.g. those intended for heavy-duty Diesel vehicles, may require higher vacuum application, such as minus 40-50 kpa, whereas light-duty Diesel vehicle parts may require vacuum application of 10-30 kpa.

The inventors have found that a better coating profile can be achieved by applying a vacuum at step (v) following inversion of the part in at least two steps: a first short, relatively weak vacuum application (of the order of −5 to −10 kpa) at relatively low vacuum pressure and without application of any holding means such as inflatable collars in the vacuum means; followed by a second longer and stronger vacuum with holding means actuation. It is believed that the shorter vacuum application serves to clear the piston surface and allow the washcoat to run along the length of the channels before the second, higher vacuum withdraws the liquid washcoat component thus immobilising the washcoat solids on a surface of the part. The time between the first and second vacuum applications may be from 5-10 seconds, such as 6-8 seconds. Heavy-duty Diesel vehicle parts may require a third or subsequent vacuum application.

The inventors have found that the methods of the invention have particular application for making wallflow filters comprising catalysts for catalysing the selective reduction of oxides of nitrogen with nitrogenous reductants such as ammonia and ammonia precursors, such as urea, for vehicular use. Such selective catalytic reduction (SCR) catalysts include $V_2O_5/WO_3/TiO_2$ and transition metal-exchanged zeolites such as Fe/Beta zeolite or Cu/CHA. A particular difficulty with making such products is balancing the competing requirements of retaining catalyst activity at an acceptable backpressure. High backpressure has a negative impact on power output and fuel economy. As emission standards, i.e. the quantities of pollutants it is permissible to emit from a vehicle, e.g. Euro 5 and Euro 6, become ever tighter they are also including legislated requirements for in-use on-board diagnostic (OBD) verification of continuing catalyst efficacy. OBD requirements are particularly relevant to catalysed filters as vehicle manufacturers typically include periodic active removal of particulate matter held on the filter in their vehicle design to maintain efficient engine performance, in which exhaust gas temperatures are increased using e.g. engine management of fuel injection and/or fuel is injected into the exhaust gas downstream of the engine and combusted on a suitable catalyst. As vehicle manufacturers are demanding catalyst products capable of whole (vehicle) life endurance, manufacturers of catalysed filters seek to counteract catalyst deactivation over time by loading the filter with as much catalyst as possible at the outset. However, as mentioned previously, increasing catalyst loading brings an undesirable increase in filter backpressure. Whilst it is possible to counteract some of the attendant difficulties with use of higher porosity filter substrates, such substrates are more fragile and more difficult to handle. An alternative means of avoiding unacceptable backpressure is to limit the amount of catalyst coating. However, decreasing the amount of SCR catalyst results in lower $NO_x$ conversion and $NH_3$ storage capacity, which is important for lower temperature $NO_x$ conversion.

In developing a method of loading a washcoat of SCR catalyst onto a wallflow filter substrate, the inventors investigated conventional coating techniques such as that disclosed in WO 2005/016497, in which a wallflow filter substrate is immersed vertically in a portion of the catalyst slurry such that the top of the substrate is located just above the surface of the slurry. That is, washcoat slurry contacts the inlet face of each channel wall, but is prevented from contacting the outlet face of each wall. The sample is left in the slurry for about 30 seconds. The substrate is removed from the slurry, and excess slurry is removed from the wallflow substrate first by allowing it to drain from the channels, then by blowing with compressed air (against the direction of slurry penetration), and then by pulling a vacuum from the direction of slurry penetration. The WO '497 disclosure claims that by use of this technique, the catalyst slurry permeates the walls of the substrate, yet the pores are not occluded to the extent that undue back pressure will build up in the finished substrate. The coated substrate is then dried typically at about 100° C. and calcined (or fired) at a higher temperature, e.g., 300 to 450° C. The process can be repeated to coat the outlet face of the wallflow filter.

More recently, manufacturers of wallflow filters have started to offer products pre-coated on an inlet face thereof with a surface membrane comprising finely divided refractory particles to improve, among other features, particle filtration. See e.g. NGK Insulator Ltd.'s EP 2158956 and Society of Automotive Engineers (SAE) Technical Paper 2008-01-0621 from the 2008 World Congress held in Detroit, Mich. Apr. 14-17, 2008 by the named inventors of EP '956. The inventors of the present invention noted particular difficulties when coating these so-called "membrane filters" using the conventional coating techniques of WO '497. See also WO 00/01463 and WO02010062794.

In particular, conventional (dip) coating of the filter into a catalyst slurry leads to build-up of coating in the membrane layer, which the present inventors believe to be due to high capillary forces that direct the coating slurry into the membrane layer. The membrane layer can become blocked (or "blinded") with coating, and the resultant filter has significantly higher backpressure. Using this conventional coating technique to coat both inlet and outlet channels of membrane filters with e.g. transition metal-exchanged zeolite-based SCR coatings results in the SCR catalyst blocking the membrane structure and the resultant SCR-coated filter has high backpressure.

The inventors reasoned that the high backpressure encountered by using a conventional dip coating process to coat both inlet and outlet channels of membrane filters could be reduced significantly by dip-coating only the outlet channels, i.e. the inlet filter channels, on which the substrate manufacturer has pre-coated the membrane surface coating, are not coated with SCR catalyst. However, when they tried this approach, the inventors found that dip-coating (via the outlet channels) resulted in a coating gradient with a higher proportion of the catalyst coating on the rear of the filter, some of which they determined to be disposed in the membrane structure, despite the catalyst being applied to the opposite face of the channel wall from the pre-coated surface membrane layer.

Subsequently, the inventors found that by applying the method according to the invention to coat the outlet channels only of a wallflow filter substrate having inlet channels coated with a membrane layer, which method using an appropriate washcoat solids content and a relatively rapid vacuum application, the outlet channel can be coated more uniformly, i.e. less or substantially no SCR catalyst applied to the outlet channels is found in the inlet membrane layer.

According to a further aspect, the invention provides a method of coating outlet channels of a wallflow filter substrate monolith to which the manufacturer of the wallflow filter substrate monolith has pre-coated to inlet channels thereof a surface membrane layer comprising finely divided inorganic solids with an axially substantially uniform catalyst washcoat, which method comprising the steps of:
  (i) holding a honeycomb monolith substrate substantially vertically;
  (ii) introducing a pre-determined volume of the liquid into the substrate via open ends of the channels at a lower end of the substrate;
  (iii) sealingly retaining the introduced liquid within the substrate;
  (iv) inverting the substrate containing the retained liquid; and
  (v) applying a vacuum to open ends of the channels of the substrate at the inverted, lower end of the substrate to draw the liquid along the channels of the substrate.

Advantages of this aspect of the present invention include that catalyst washcoating (via the outlet channels) decreases the coating gradient and gives lower soot loaded backpressure, (where ammonia or an ammonia precursor is used as a reductant) a higher $NH_3$ storage and a higher $NO_x$ conversion (fresh and hydrothermally aged) compared to an identical catalysed substrate monolith wherein the catalyst washcoat is instead applied to the outlet channels by a conventional dip-coating technique (as described in WO '497). The inventors believe that this improved coating uniformity should also contribute to better flow distribution over the filter, which is relevant for dosing of reducing agents such as nitrogenous reducing agents and subsequent control of $NH_3$ slip and $NO_x$ conversion.

Figure 8:
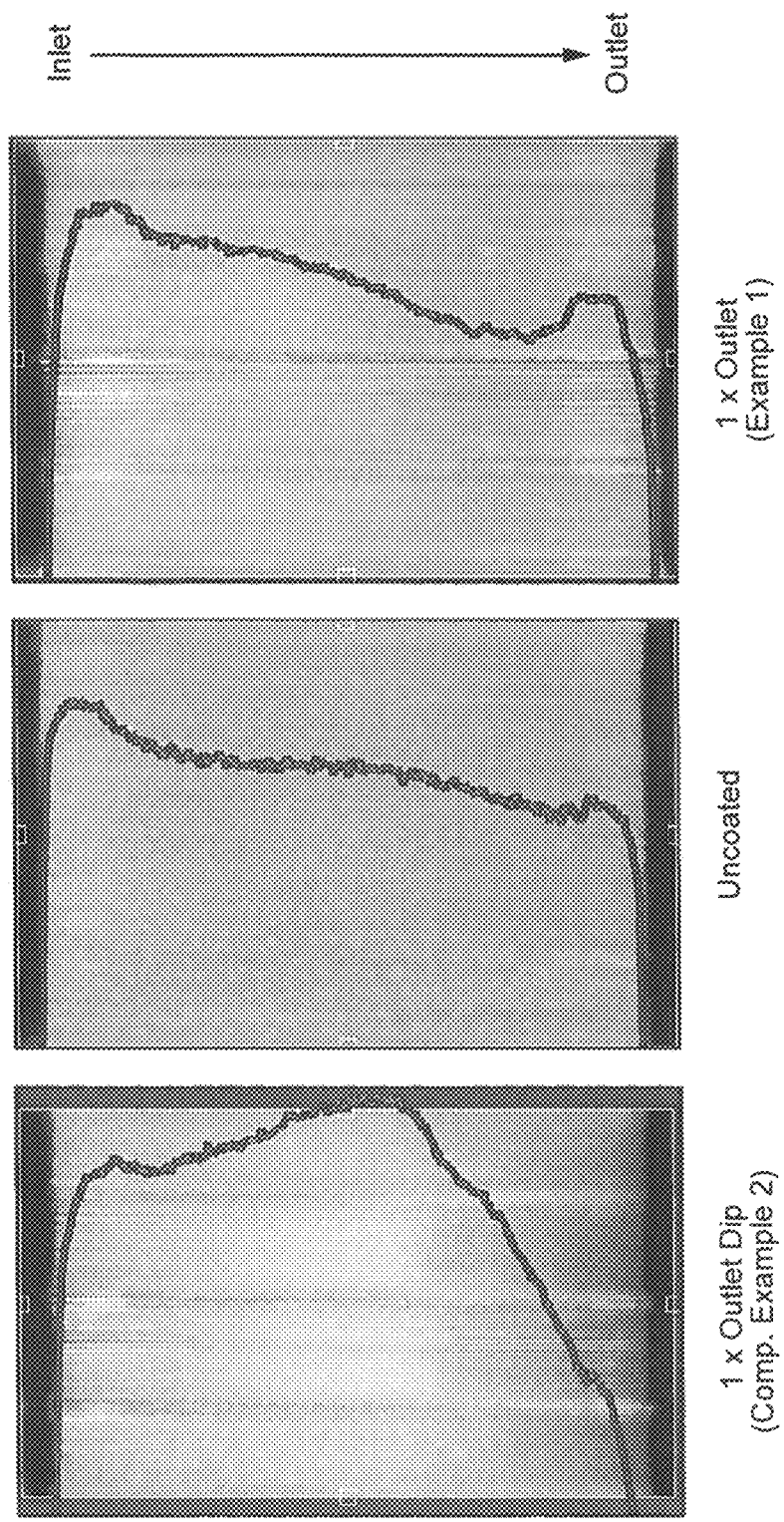
FIG. 8 compares x-ray density profiles for three wallflow filters, a first (the control) "as-received" from a supplier, wherein the inlet channels were pre-coated with a membrane layer comprising finely divided inorganic refractory material, a second "as-received" and additionally coated on the outlet channels with a SCR catalyst using a dip coating method (Comparative) and a third "as-received" and additionally coated on the outlet channels with the same SCR catalyst at a similar washcoat loading to the second but using the process according to the invention.

As can be seen in Example 1 and FIG. 8, reducing the amount of catalyst on the rear of a filter is also beneficial for "real-world" ageing conditions, as this region is generally exposed to more severe conditions (higher temperatures and greater ash exposure) which can result in relatively lower catalytic performance from this region than that of the front part of the filter. Utilising the coating method according to the present invention (via the outlet channels instead of dip coating via the outlet channels) can decrease the proportion of the catalyst coated on the rear of the filter and should give a real-world performance benefit.

A further advantage of the methods of the present invention generally over conventional dip-coating methods is that selective adsorption of components from a multi-component catalyst washcoat at the expense of one or more other components of the washcoat by the honeycomb substrate monolith can be substantially reduced or eliminated compared to a conventional dip coating method.

According to a further aspect, the invention provides a catalysed wallflow filter substrate monolith to which the manufacturer of the wallflow filter substrate monolith has pre-coated to inlet channels thereof a surface membrane layer comprising finely divided refractory solids, wherein the outlet channels comprise an axially substantially uniform coating profile of catalyst washcoat, which catalysed wallflow filter substrate monolith is obtainable by the method according to the invention.

According to a further aspect, the invention provides a catalysed wallflow filter substrate monolith to which the manufacturer of the wallflow filter substrate monolith has pre-coated to inlet channels thereof a surface membrane layer comprising finely divided refractory solids, wherein the outlet channels comprise an axially substantially uniform coating profile of catalyst washcoat, wherein the washcoat loading in an axially upstream half of the catalysed wallflow filter substrate monolith is within 10% (preferably within 8%, more preferably within 5%) of the washcoat loading in the axially downstream half thereof.

In embodiments, the porosity of the wallflow filter substrate monolith according to the latter two aspects of the invention prior to coating is from 40 to 80%. In preferred embodiments, the porosity of filters for use in the present invention are typically >40% or >50% and porosities of 45-75% such as 50-65% or 55-60%.

In further embodiments, a mean pore volume of the wallflow filter substrate monolith prior to coating is from 8 to 45 µm, for example 8 to 25 µm, 10 to 20 µm or 10 to 15 µm. In particular embodiments, the first mean pore size is >18 µm such as from 15 to 45 µm, 20 to 45 µm e.g. 20 to 30 µm, or 25 to 45 µm.

In embodiments, the catalyst washcoat applied to the outlet channels of the wallflow filter substrate monolith of the invention is a $NO_x$ trap, a catalysed soot filter washcoat comprising supported platinum group metal or a $NH_3$—SCR catalyst, preferably a $NH_3$—SCR catalyst.

Preferably the $NH_3$—SCR catalyst comprises a transition metal exchanged zeolite and most preferably the transition metal is selected from the group consisting of copper, iron, cerium and mixtures of any two or more thereof and the zeolite is selected from the group consisting of Ferrierite, CHA, BEA and MFI (ZSM-5). Particularly preferred combinations are Cu/CHA, Fe/Ferrierite, Fe/ or Fe—Ce/ZSM-5 and Fe or Fe—Ce/BEA.

FIG. 1 shows the starting position for an apparatus 10 according to the invention, wherein 12 is a holding means comprising a housing 14 for receiving a lower end of a substrate monolith and a pair of inflatable collars 16a, 16b in the deflated condition, wherein the charge piston 18 disposed within cylinder 20 is in the extended, or first, position.

Figure 2:
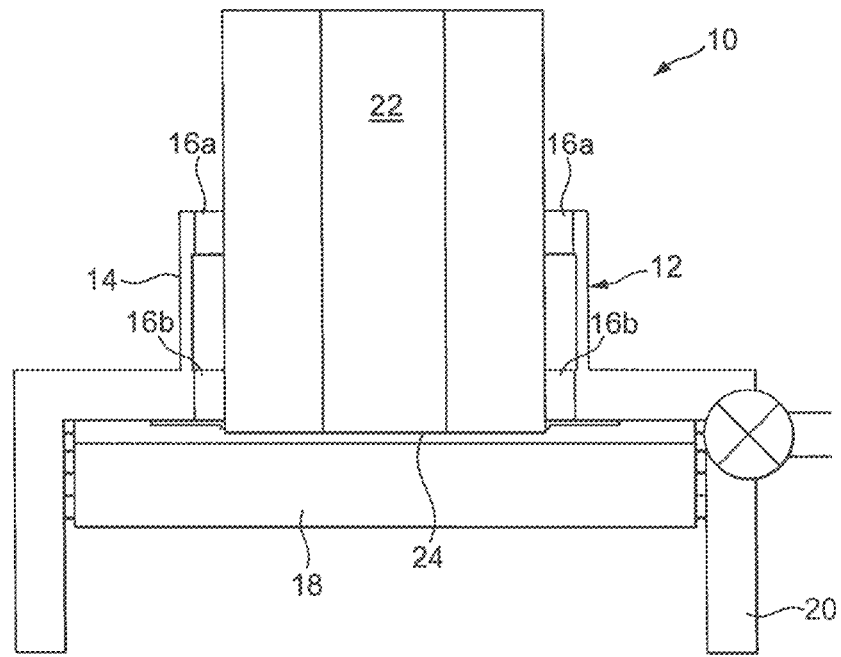
FIG. 2 shows the apparatus of FIG. 1 with a substrate inserted.

FIG. 2 shows the arrangement wherein a substrate 22 is inserted into the holding means 12 by e.g. a "pick and place" robotic arm and is supported by a surface of the piston head 24 comprising an elastometric material.

Figure 3:
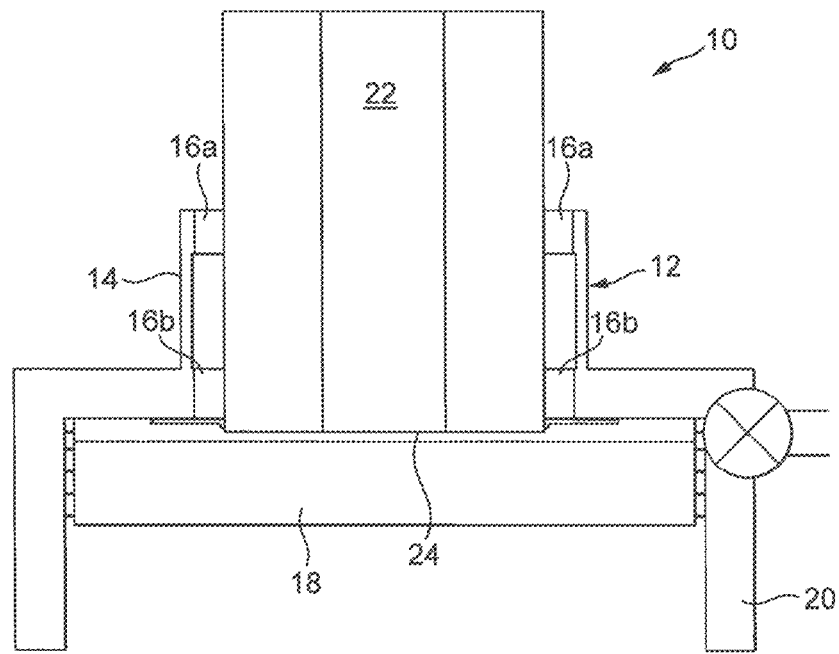
FIG. 3 shows the arrangement of apparatus and substrate wherein the substrate is held by actuation of inflatable collars.

FIG. 3 shows the apparatus of FIG. 2, wherein the inflatable collars 16a, 16b are actuated to engage with an outer surface of the substrate monolith 22.

Figure 4:
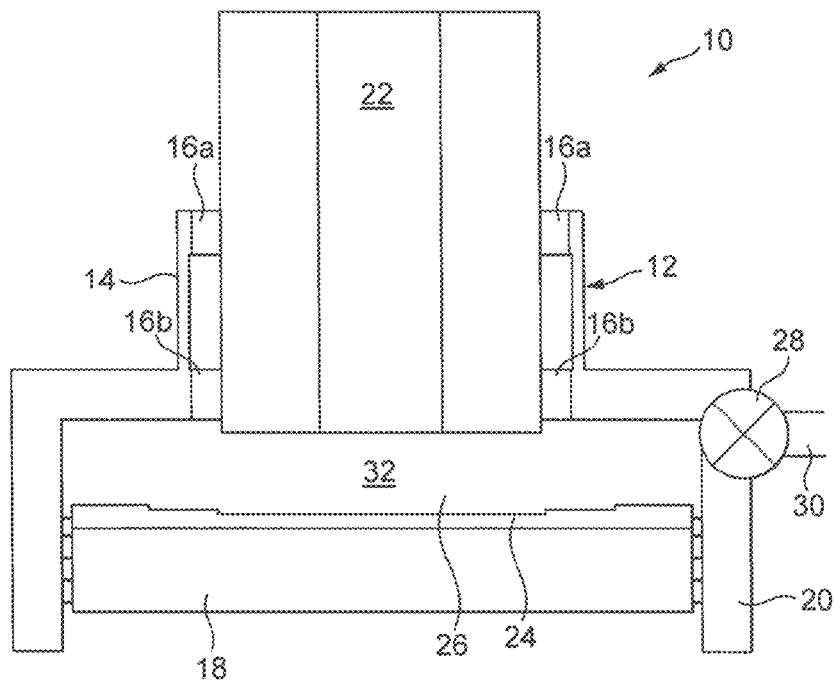
FIG. 4 shows the arrangement wherein a charge piston is lowered and a measured dose of washcoat is introduced into a displacement volume via a dose control valve.

FIG. 4 shows how the charge piston 18 is lowered by a servo (not shown) to a pre-programmed depth and a measured dose of washcoat 26 is pumped through a dose control valve 28 by a volumetric depositor (not shown) via washcoat supply line 30 into the displacement volume 32 defined, in part, by an internal wall of the cylinder, the cylinder head and the piston head 18.

Figure 5:
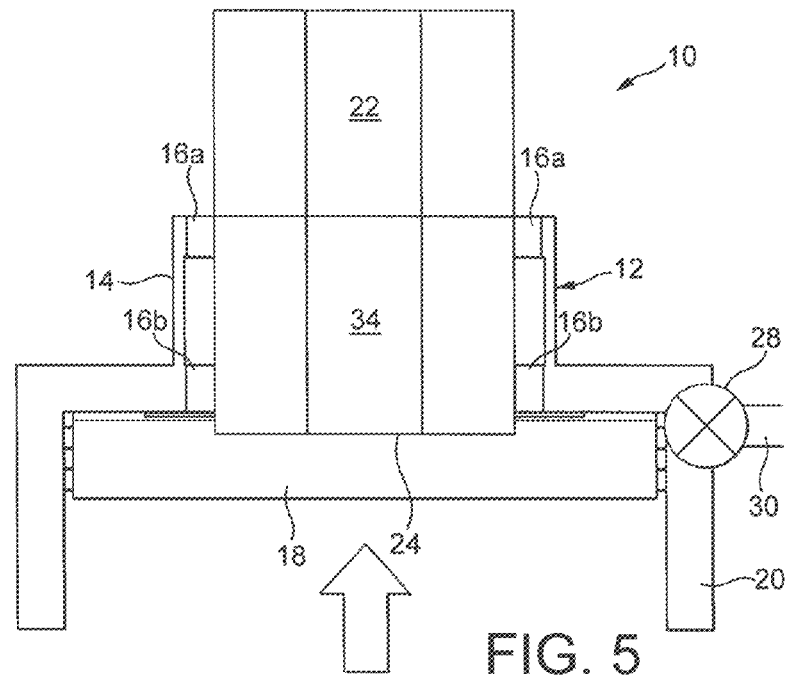
FIG. 5 represents the arrangement of FIG. 4, wherein the dose control valve is closed and the piston has driven the washcoat charge into the substrate.

In FIG. 5, with the dose control valve 28 closed, the washcoat charge 26 is pushed into the base of the substrate 22. The piston 18 is returned to the first position and the elastomeric material face seals the dosed lower end face of the substrate 22 in preparation for inversion.

Figure 6:
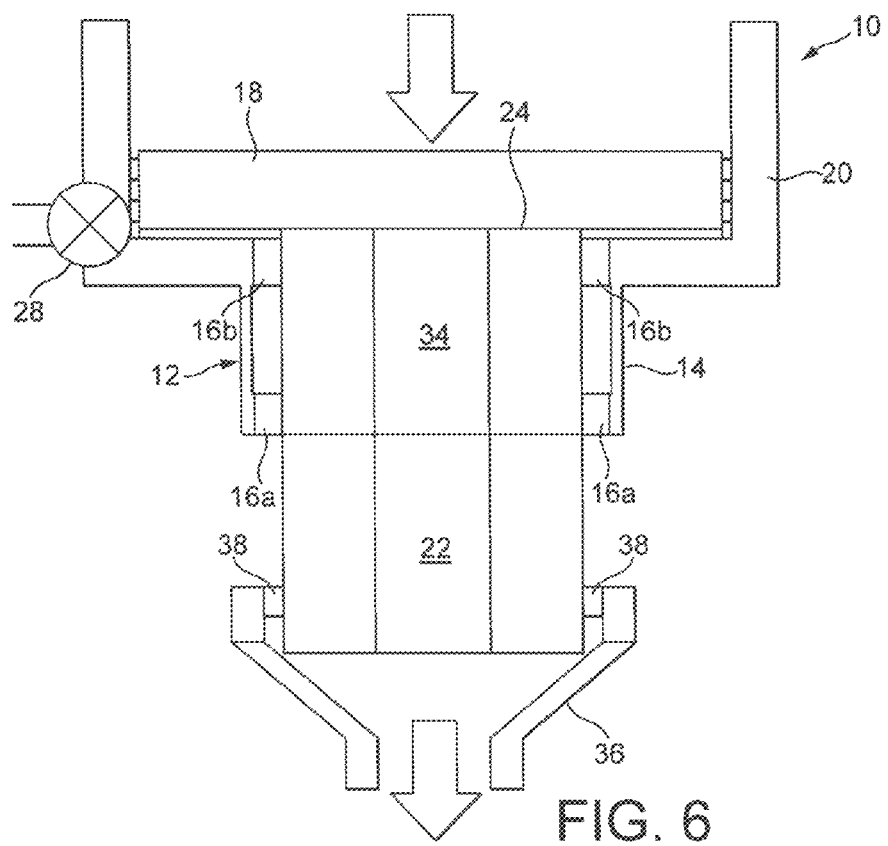
FIG. 6 shows the arrangement wherein the apparatus is inverted and the lower end of the inverted substrate is inserted into an open end of a funnel featuring an inflatable collar seal for application of a vacuum.
Figure 7:
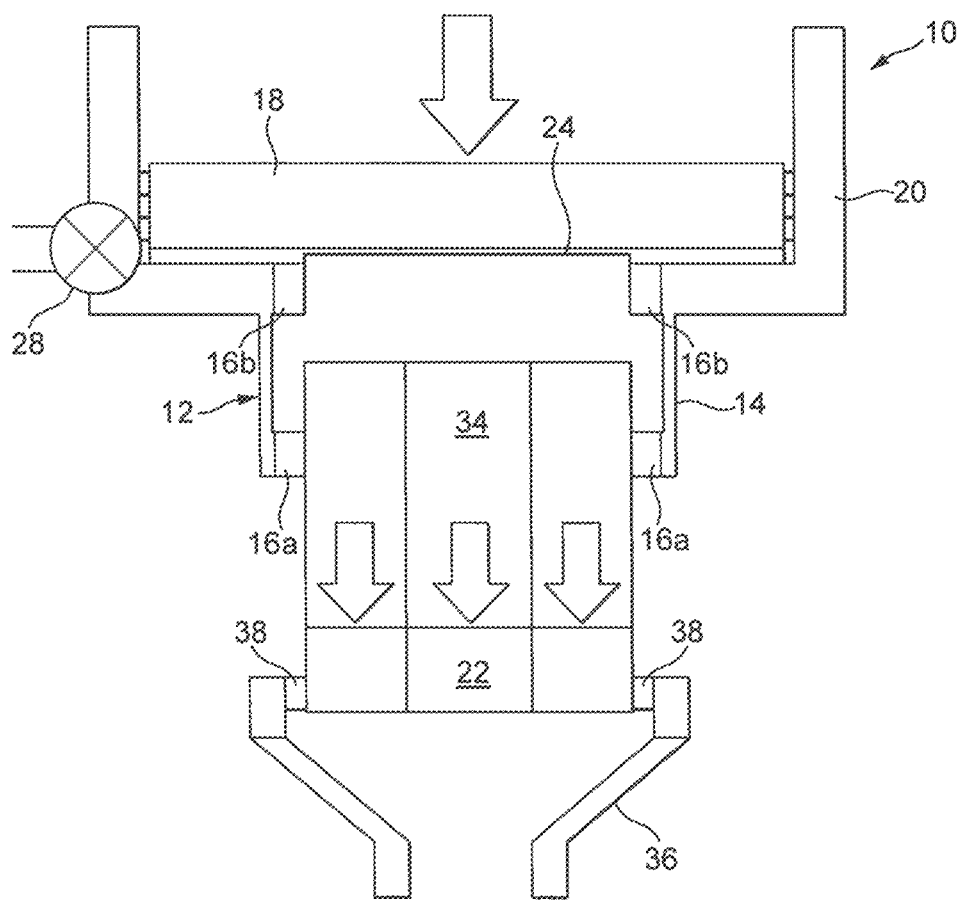
FIG. 7 shows the step wherein the inflatable collars of the (first) holding means disengage from the substrate so that the substrate is held by the vacuum funnel collar and a vacuum is applied to draw the washcoat into the substrate monolith.

In FIG. 6, the substrate 22 is inverted, e.g. rotated through 180, into position above a vacuum cone 36. The vacuum cone 36 is raised into position by means of a pneumatic cylinder (not shown). An inflatable collar 38 in the vacuum cone is activated and a first vacuum actuation is triggered.

The inflatable collars 16a, 16b of the holding means 12 disengage and the vacuum cone 36 pulls the substrate 22 downwards and away from the surface of the piston head 24 (the vacuum cone collar 38 remains engaged and the pneumatic piston pulls the substrate downwards). Subsequently, further vacuum actuations are applied to the substrate 22. There can be any number of vacuum actuations, but in the illustrated embodiment there are two vacuum actuations when the substrate has been disengaged from the piston head. At this stage the final axial coating depth is achieved as the liquids are removed from the washcoat slurry.

By means of the pneumatic cylinder, the vacuum cone 36 pushes the substrate 22 upwards and the inflatable collars 16a, 16b are re-engaged. The vacuum cone collar 38 disengages and then the vacuum cone 36 is moved downwards. The substrate 22 and apparatus 10 is then rotated back into the first, upright position so that the coated substrate can be removed vertically, e.g. using a "pick-and-place" device for subsequent drying. A fresh substrate can then be inserted into holding means 14 of apparatus 10 and the routine can be repeated.

EXAMPLES

Example 1 and Comparative Example 2

Application of SCR Catalyst to Outlet Channels of Commercially Available Wallflow Filter Having Supplier Pre-coated Inlet Channel Membrane Layer In this Example 1, a commercially available silicon carbide wallflow filter (NGK Insulators Ltd., Product code: MSC-111), with circular cross-section (5.66 inch (14.4 cm) diameter) and 6 inches (15.24 cm)) in axial length, having a cell density of 300 cells per square inch, channel wall thickness of 0.305 mm, porosity of 52% and mean pore size of 23 µm estimated by mercury porosimetry and having inlet channels pre-coated by the supplier (i.e. NGK) with a membrane layer comprising finely divided refractory particles was used to compare the physical and chemical properties of the filter having outlet channels coated with a SCR catalyst by the method according to the invention and a conventional dip coating method.

A washcoat comprising a dispersion of copper exchanged (2.5 wt % copper) CHA molecular sieve $NH_3$—SCR catalyst was applied to a 100% axial length of the outlet channels only of the MSC-111 product using the apparatus and method according to the invention. The washcoat solids content of the Cu/zeolite catalyst was 25% and a silica sol binder at 10% washcoat solids was included. A washcoat loading of 0.95 gin$^{-3}$ was achieved. The coated part was dried in flowing air at 100° C. and calcined (i.e. fired) at 500° C. for 1 hour.

For Comparative Example 2, a similar product at identical washcoat loading was obtained by a dip coating method described in WO 2005/016497 using an identical washcoat composition, i.e. the wallflow filter was (1) dipped into the slurry to a depth sufficient to coat the channels of the substrate along the entire axial length of the substrate from one direction; (2) vacuumed from the coated side for approximately 20 seconds; and dried and calcined as for Example 1.

Aged catalysed filters were prepared by lean hydrothermally ageing products of Example 1 and Comparative Example 2 at 800° C. for 16 hours in 10% oxygen ($O_2$), 10% water vapour, nitrogen ($N_2$) balance.

Example 3

X-Ray Density Analysis of Coated Filters

Coated wallflow filters prepared according Example 1 and Comparative Example 2 were analysed using x-ray density analysis and compared with a MSC-111 filter as received from the supplier (i.e. having inlet channels pre-coated with a membrane layer, but without SCR coating applied to the outlet channels). The results are shown in FIG. 8, wherein the x-ray density trace is overlayed on the x-ray of the coated or "virgin" part. X-ray density data points furthest to the left for a given axial location along the length of the filter indicate relatively high density, e.g. the end-plugs of the wallflow filter. Contrastingly, data points furthest to the right for a given axial location along the length of the filter indicate relatively low density.

It can be seen from the x-ray density trace for the "as-received" MSC-111 part that a density gradient already exists between the inlet end and the outlet end that the inventors surmise results from the membrane layer applied by the supplier (outlet end having higher washcoat density than the inlet end). Comparing the x-ray density trace for the "as received" product with the Comparative Example 2 product, it can be seen that the coating profile increases in density towards the outlet end. It can also be seen that the density actually decreases from the inlet end towards the middle of the Comparative Example 2 part relative to the "as received" part.

The inventors speculate that this coating profile may be because of the higher density solids at the outlet end cause uneven airflow during vacuum application in the manufacture of Comparative Example 2 so that the airflow causes a high level of washcoat clearing from the axially central portion of the Comparative Example 2 part. It is also possible that this observation may result from batch-to-batch variation in the "as received" part.

By contrast, the filter of Example 1 has a density profile that is substantially similar to the "as-received" part, including a similar trend of washcoat density from the inlet end to the outlet end.

Example 4

Soot Loaded Back Pressure Analysis

The rate of back-pressure increase relative to soot loading for each of the filters of Example 1 and Comparative Example 2 using Diesel exhaust gas containing particulate matter were tested using the Diesel particulate generator (DPG) and test cell disclosed in European Patent 1850068 A1 and manufactured by Cambustion Ltd. That is, an apparatus for generating and collecting particulate matter derived from combusting a liquid carbon-containing fuel, which apparatus comprising a fuel burner comprising a nozzle, which nozzle is housed in a container, which container comprising a gas inlet and a gas outlet, said gas outlet connecting with a conduit for transporting gas from the gas outlet to atmosphere, means for detecting a rate of gas flowing through the gas inlet and means for forcing an oxidising gas to flow from the gas inlet via the container, the gas outlet and the conduit to atmosphere, a station for collecting particulate matter from gas flowing through the conduit and means for controlling the gas flow-forcing means in response to a detected gas flow rate at the gas inlet, whereby the rate of gas flow at the gas inlet is maintained at a desired rate to provide sub-stoichiometric fuel combustion within the container, thereby to promote particulate matter formation.

The filters were fitted each in turn in the station with the inlet channels pre-coated by the supplier with membrane layer disposed to receive particulate-containing exhaust gas first. The apparatus was operated with standard forecourt pump Diesel fuel containing a maximum of 50 ppm sulphur. The DPG unit was operated with a gas mass flow rate of 250 kg/hour, a particulate generation rate of 10 g/hr with an inline particulate silicon carbide filter maintained at about 240° C. During the particulate matter loading of each filter the back pressure was determined by a differential pressure sensor and logged on a computer every 10 seconds.

Figure 9:
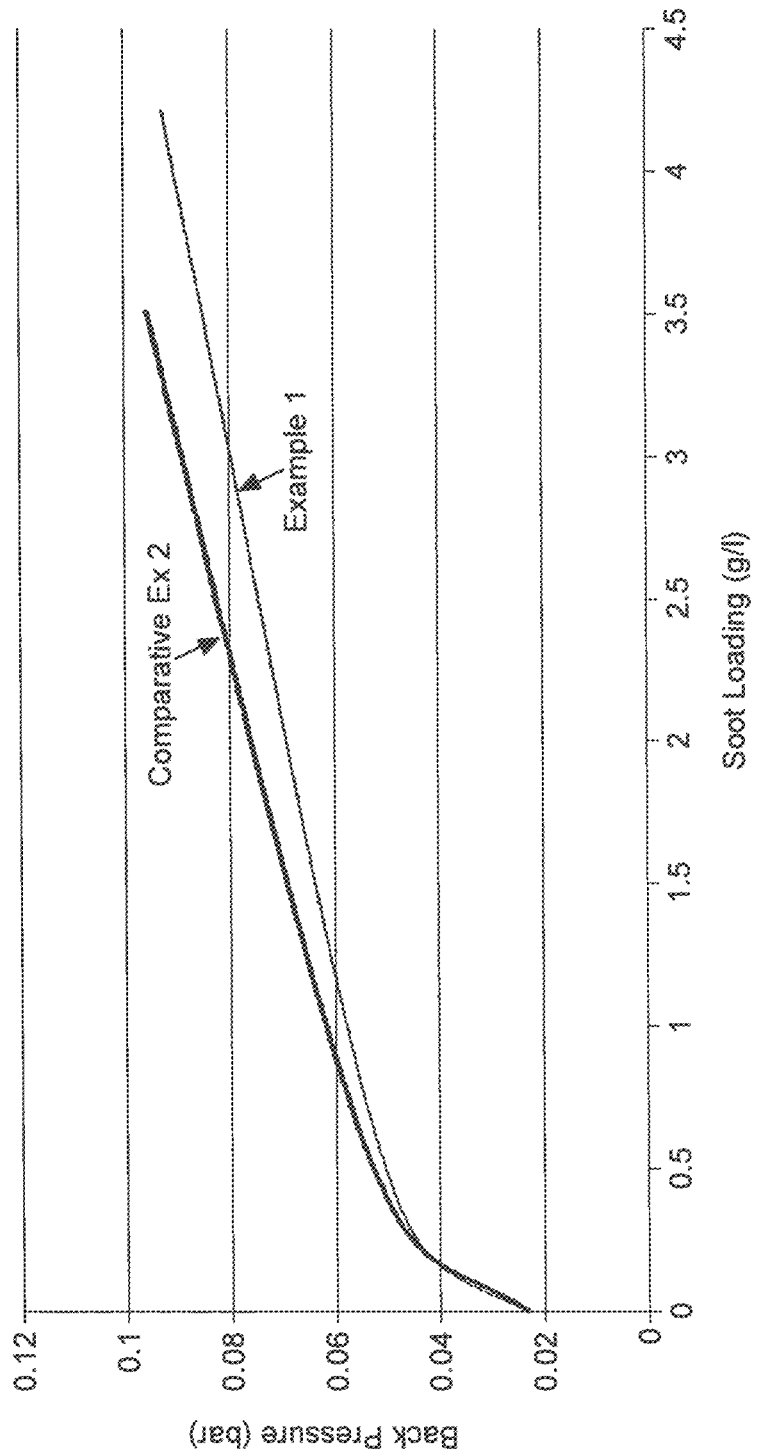
FIG. 9 is a graph comparing the soot loading vs. back pressure for fresh samples of wallflow filters prepared by a dip coating method (Comparative) and the method according to the invention.

The results are shown in FIG. 9, from which can be seen the soot loading vs. back pressure for fresh samples of wallflow filters prepared by a dip coating method (Comparative) in comparison to a sample prepared according to an embodiment of the invention (Example 1).

Example 5

Fresh and Aged Bench Engine Activity Comparison of Coated Filters

The filters of Example 1 and Comparative Example 2 were each fitted in turn to the exhaust gas system of a bench-mounted Euro IV compliant, 2 liter direct injection, common rail engine (suitable e.g. for a passenger car) downstream of a 1 liter oxidation catalyst (95 g/ft$^3$ with 2:1 weight ratio of platinum and palladium coated onto a 350 cell per square inch cordierite monolithic flow-through substrate), with the filter orientated so that the channels provided with the pre-coated membrane layer were on the gas inlet side of the filter. Standard Diesel fuel was used with 50 ppm sulphur content. A urea injector for injecting urea solution (AdBlue) into exhaust gas was disposed between the oxidation catalyst and the filter. Diesel fuel of <10 ppm sulphur was used. Following an initial warm-up phase, the engine was run at a series of engine loads in order to achieve a desired filter inlet temperature. The test conditions used were as shown in Table 1. "Alpha" is defined as the $NH_3/NO_x$ ratio. So for an "Alpha of 0.7, a theoretic maximum $NO_x$ conversion is 70% according to the reactions $4NO+4NH_3+3O_2 \rightarrow 4N_2+6H_2O$; and $NO+NO_2+2NH_3 \rightarrow 2N_2+3H_2O$. An Exhaust Gas Recirculation valve position programmed into the engine control strategy of the engine was overridden in order to turn EGR off, so that steps 3-5 inclusive would be concluded in a reasonable period of time (instead of hours). The entire series of steps 1 through 5 were conducted one immediately following another.

TABLE 1

Experimental Protocol for NO$_x$ Conversion and NH$_3$ Slip Tests

| Step No. | Filter inlet temperature (° C.) | Urea injection strategy | Step end point |
|---|---|---|---|
| 1 | 450 | Target 0.7 Alpha (EGR on) | 2.5 minutes at set evaluation point |
| 2 | 400 | Target 0.7 Alpha (EGR on) | 2.5 minutes at set evaluation point |
| 3 | 300 | Target 1.5 Alpha (EGR off) | Detection of 20 ppm ammonia slip at filter outlet |
| 4 | 250 | Target 1.5 Alpha (EGR off) | Detection of 20 ppm ammonia slip at filter outlet |
| 5 | 220 | Target 1.5 Alpha (EGR off) | Detection of 20 ppm ammonia slip at filter outlet |

Figure 10:
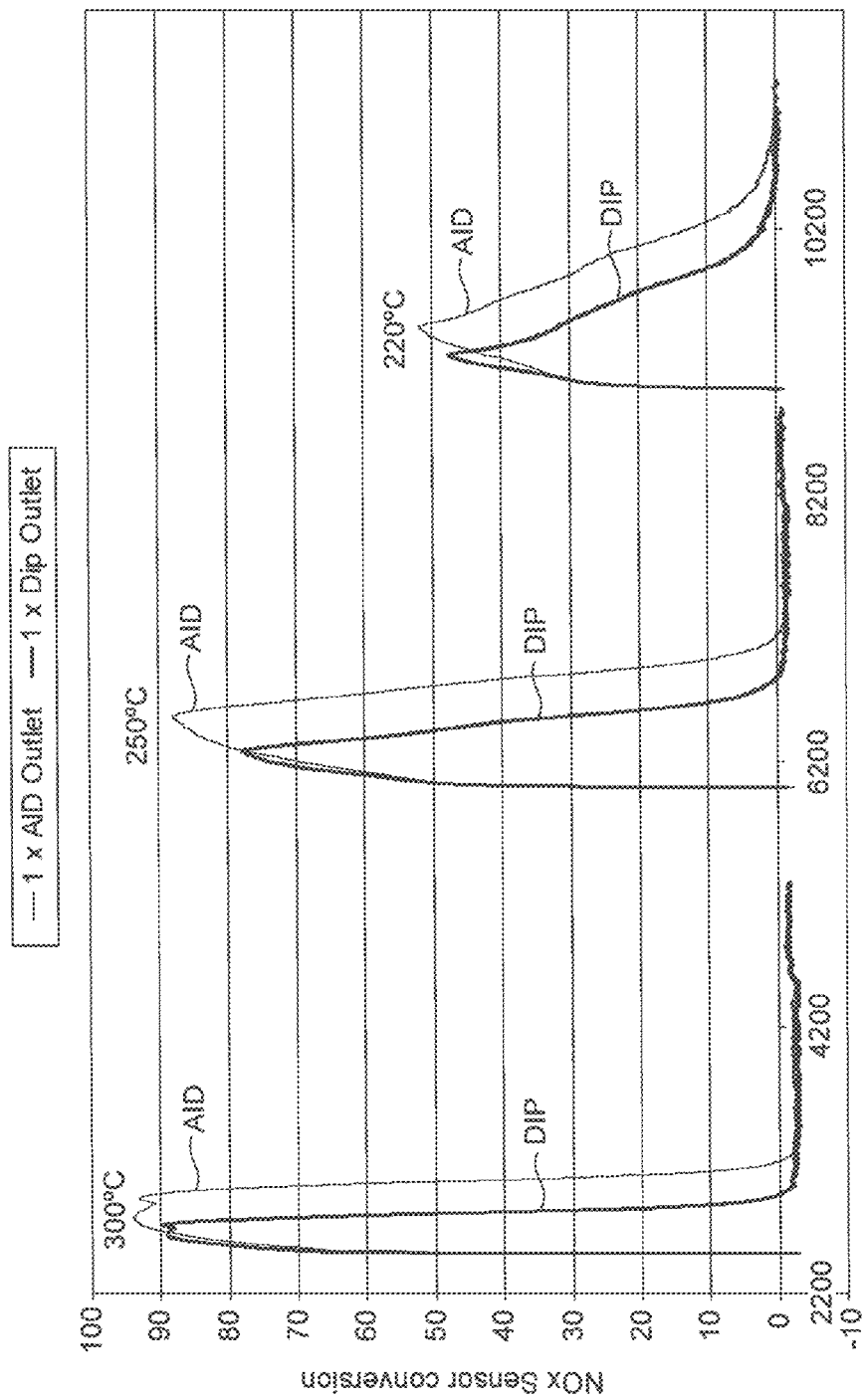
FIG. 10 is a graph comparing the fresh $NO_x$ conversion activity for filters prepared according to Example 1 and Comparative Example 2 fitted in the exhaust system of a laboratory bench-engine and tested according to the experimental protocols described in Example 5. In this Figure and subsequent Figures, the product of Example 1 is labelled "AID" and the product of Comparative Example 2 is labelled "Dip"
Figure 11:
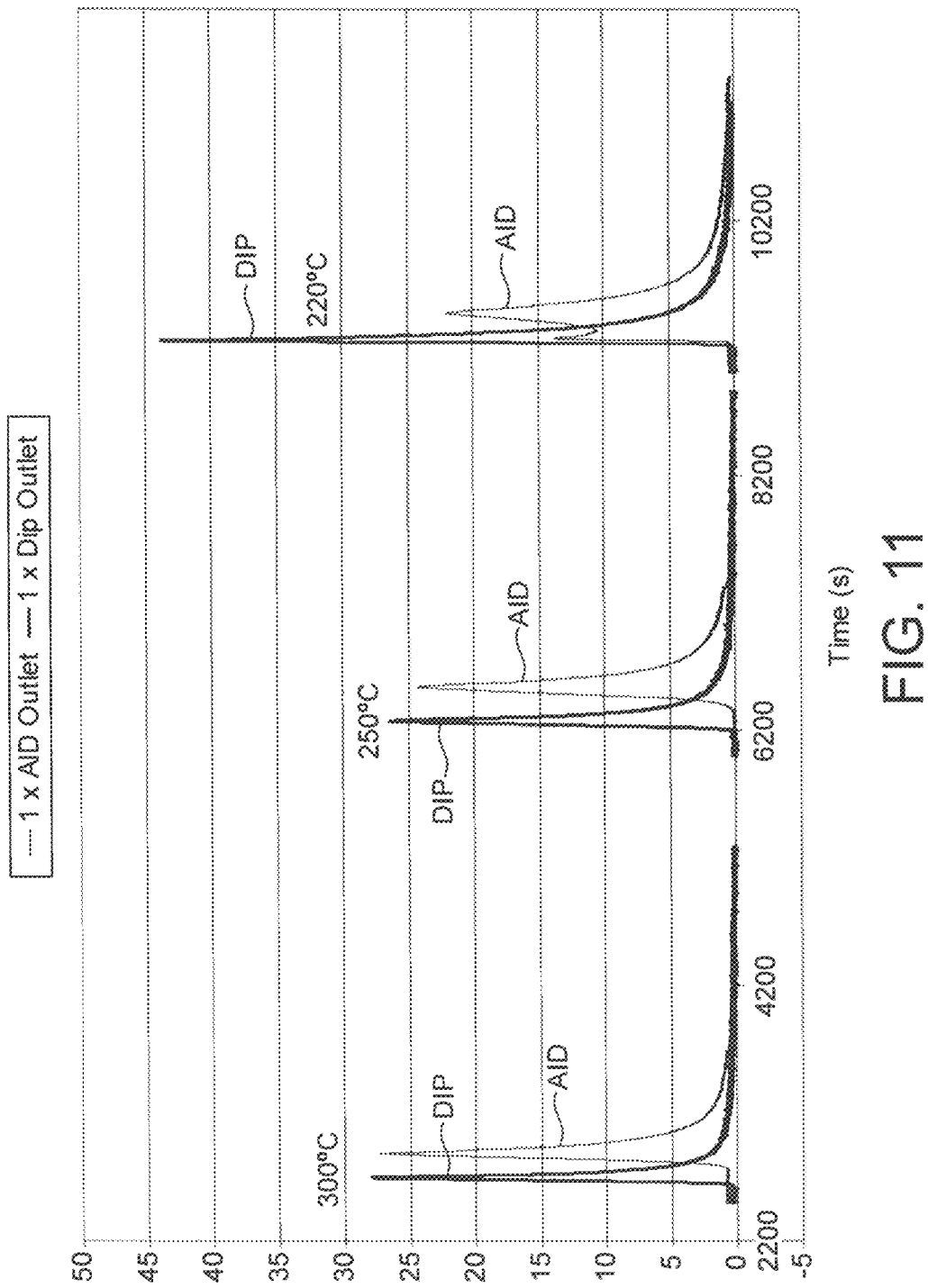
FIG. 11 is a graph comparing the rate of $NH_3$ slip for the fresh filters during the $NO_x$ conversion tests shown in FIG. 10.

The results for the "fresh" catalysed filters are shown in FIGS. 10 and 11, wherein it can be seen that the peak NO$_x$ conversion activity of the catalysed filter of Example 1 is significantly better at each of the three temperature data points shown. For the NH$_3$ slip test, it can be seen that NH$_3$ is slipped later for the Example 1 catalysed filter than the Comparative Example 2 catalysed filter. This shows that the catalysed filter of the invention has a greater NH$_3$ storage capacity than the Comparative filter, which is important for promoting NO$_x$ conversion at low temperature.

Figure 12:
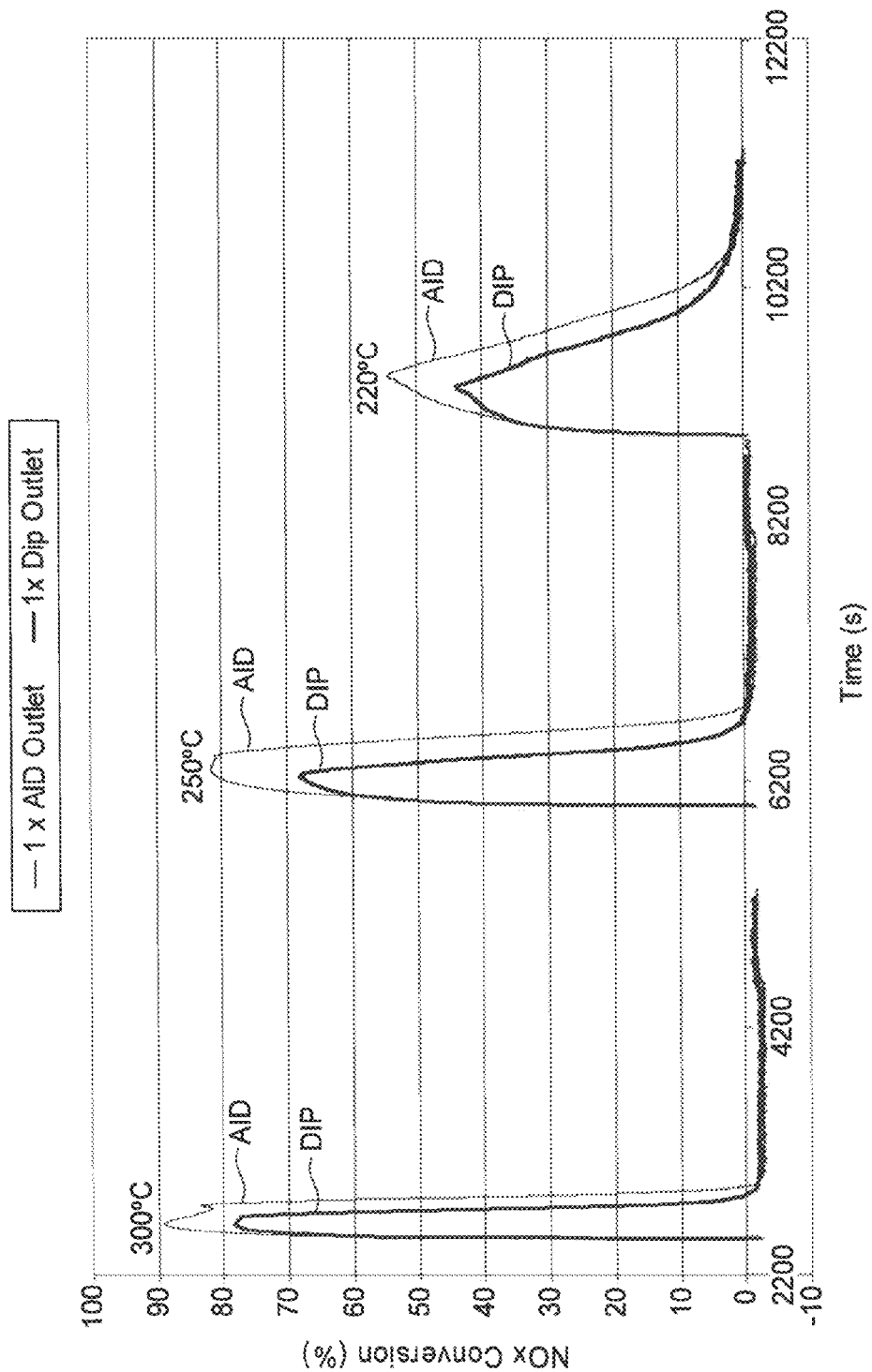
FIG. 12 is a graph comparing the aged $NO_x$ conversion activity for filters prepared according to Example 1 and Comparative Example 2 fitted in the exhaust system of a laboratory bench-engine and tested according to the experimental protocols described in Example 5.
Figure 13:
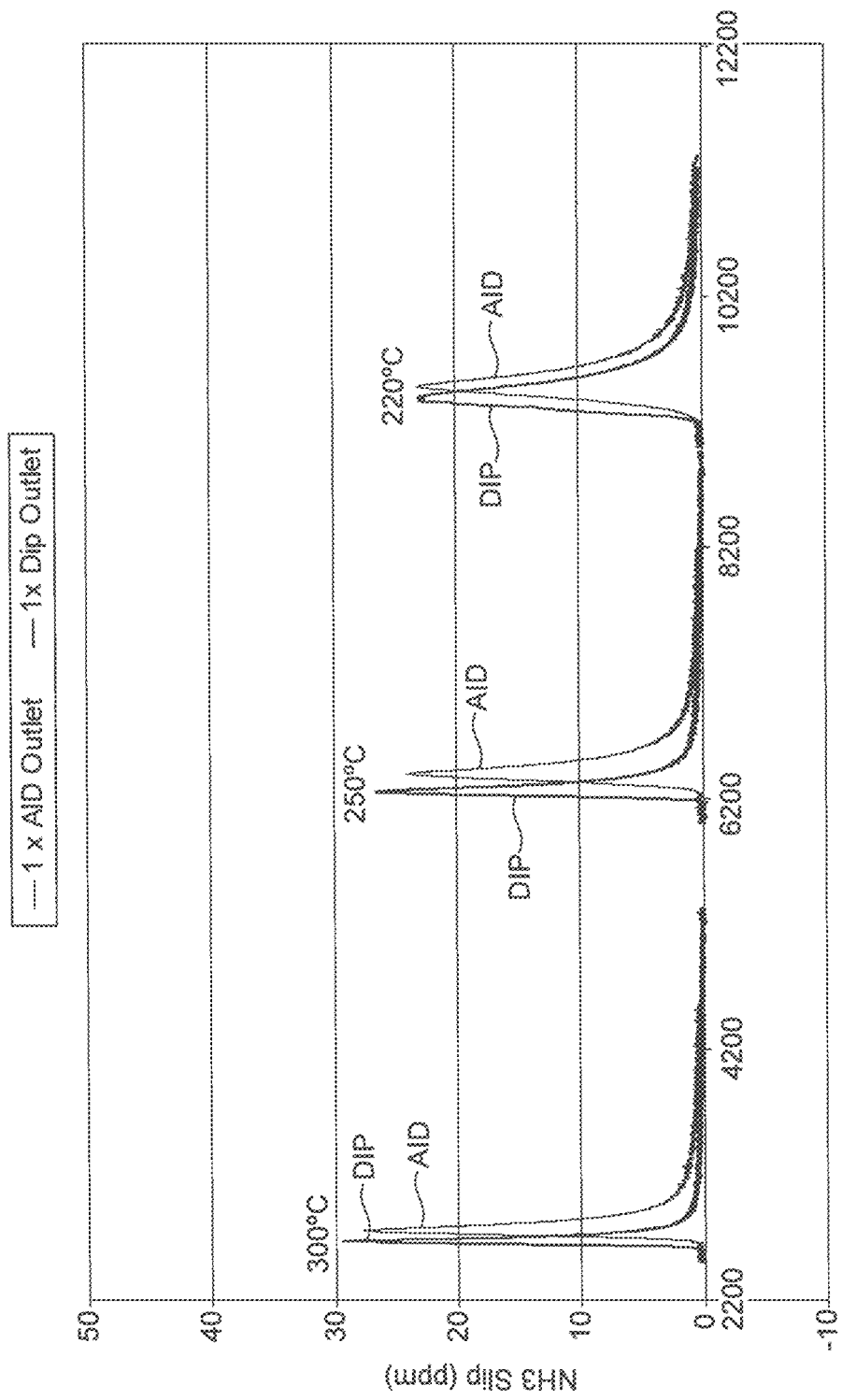
FIG. 13 is a graph comparing the rate of $NH_3$ slip for the aged filters during the $NO_x$ conversion tests shown in FIG. 12.

The corresponding results for the aged samples are shown in FIGS. 12 and 13 respectively, wherein the NO$_x$ conversion activity is significantly better for the Example 1 sample than the sample of Comparative Example 2. The same delay in ammonia slip is also seen showing that, post-ageing, the same advantages are maintained for the relative to the fresh samples.

From the results of the Examples taken as a whole, it can be seen that the MSC-111 wallflow filter samples outlet channel-coated with SCR catalyst according to the present invention show a more uniform coating profile, have a lower soot-loading backpressure and greater NH$_3$—SCR NO$_x$ conversion (both fresh and aged) and greater NH$_3$ storage capacity than the same wallflow filter coated using a conventional, prior art dip-coating technique.

For the avoidance of any doubt, the entire content of each patent document referenced in this specification is incorporated herein by reference in its entirety.

The invention claimed is:

1. An apparatus for coating a honeycomb monolith substrate comprising a plurality of channels with a liquid comprising a catalyst component, which apparatus comprising:

(a) housing for receiving a lower end of the honeycomb monolith substrate and for holding the honeycomb monolith substrate substantially vertically;
(b) a piston for introducing a pre-determined volume of the liquid into the honeycomb monolith substrate via open ends of the channels at a lower end of the honeycomb monolith substrate, wherein the piston reciprocates within a cylinder;
(c) means for sealingly retaining the introduced liquid within the honeycomb monolith substrate comprising a shutter, an iris or a surface of a head of the piston;
(d) an inverting means for inverting the honeycomb monolith substrate containing the retained liquid; and
(e) a funnel for applying a vacuum to open ends of the channels of the honeycomb monolith substrate at the inverted, lower end of the substrate to draw the liquid along the channels of the honeycomb monolith substrate, wherein the funnel has a wider end for receiving the inverted end of the honeycomb monolith substrate.

2. The apparatus of claim 1, wherein the housing comprises an inflatable collar disposed on an internal surface of the housing for engaging with an outer surface of the honeycomb monolith substrate.

3. The apparatus of claim 1, wherein the piston reciprocates between a first position wherein a piston head abuts a cylinder head and a second position wherein an internal wall of the cylinder, the cylinder head and piston head define, at least in part, a displacement volume.

4. The apparatus of claim 3, wherein a surface of the piston head supports the lower end of the honeycomb monolith substrate when the piston is in the first position.

5. The apparatus of claim 1, wherein a casing of the cylinder comprises a valve for supplying the liquid to a bore of the cylinder.

6. The apparatus of claim 1, wherein the means for sealingly retaining the introduced liquid within the honeycomb monolith substrate comprises the surface of the head of the piston.

7. The apparatus of claim 6, wherein the housing, piston and cylinder are inverted by the inverting means.

8. The apparatus of claim 1, further comprising means for sealing an outer surface of the honeycomb monolith substrate from the open ends of the channels at the lower end of the honeycomb monolith substrate.

9. The apparatus of claim 8, wherein the means for sealing the outer surface of the honeycomb monolith substrate from the opens ends of the channels at a lower end of the substrate comprises the inflatable collar.

10. The apparatus of claim 1, further comprising computer operated means for controlling the apparatus.

* * * * *